United States Patent [19]

Lebel

[11] Patent Number: 4,745,573
[45] Date of Patent: May 17, 1988

[54] PROGRAMMABLE CLOCK GENERATOR

[75] Inventor: Ronald J. Lebel, Los Angeles, Calif.

[73] Assignee: Symbolics Inc., Cambridge, Mass.

[21] Appl. No.: 851,006

[22] Filed: Apr. 11, 1986

[51] Int. Cl.[4] .............................................. G06F 1/04
[52] U.S. Cl. .................................... 364/900; 307/465
[58] Field of Search ... 364/200 MS File, 900 MS File; 307/465, 480

[56]  References Cited

U.S. PATENT DOCUMENTS

| | | | |
|---|---|---|---|
| 4,257,108 | 3/1981 | Igel | 364/900 |
| 4,321,687 | 3/1982 | Parsons et al. | 364/900 |
| 4,575,794 | 3/1986 | Veneski et al. | 307/465 X |

Primary Examiner—Thomas M. Heckler
Attorney, Agent, or Firm—Sprung, Horn, Kramer & Woods

[57] ABSTRACT

A programmable clock generator includes programmable logic arrays implementing a shift register and control circuits elements connected between the inputs and outputs of the shift register elements and responsive to a code applied thereto for skipping preselected shift register elements during shifting. At least one JK flip-flop is receptive of timing signals from non-skipped shift register elements at the J and K inputs thereof to produce a clock signal at the output thereof.

1 Claim, 1 Drawing Sheet

PROGRAMMABLE CLOCK GENERATOR

BACKGROUND OF THE INVENTION

The present invention relates to a symbolic processing system and in particular to a programmable clock generator therefor.

A symbolic processing system of the type to which the present invention relates is disclosed in copending U.S. application No. 450,600 filed Dec. 17, 1982 and now pending. That system includes a microprogrammable processor which carries out compiled functions on the basis of a series of macroinstructions, with each macroinstruction corresponding to at least one microinstruction.

Sophisticated computer systems of this type utilize various clock signals for carrying out the system timing.

It has been found to be desirable to have a clock signal which can be speeded up or slowed down without adversely affecting other clock signals which are generated in dependence thereon or on a basic clock pulse.

SUMMARY OF THE INVENTION

The main object of the present invention is to provide a programmable clock generator which can be controlled by system microcode in order to speed up or slow down system clock signals without affecting the relative timing thereof.

These and other objects and advantages of the present invention are achieved in accordance with the present invention by a programmable clock generator implemented on two programmable logic arrays comprising a shift register having a plurality of register elements, each register element producing a timing signal during shifting, and control circuits connected between inputs and outputs of the shift register elements and responsive to a code from the system microcode for skipping preselected shift register elements during shifting of the shift register and at least one JK flip flop receptive of timing signals from the non-skipped shift register elements at the J and K inputs thereof to produce clock signals at the outputs of the flip flops.

Other features and advantages of the present invention will be understood from the following detailed description of the invention and drawings wherein:

DETAILED DESCRIPTION OF THE INVENTION

Figure 1:
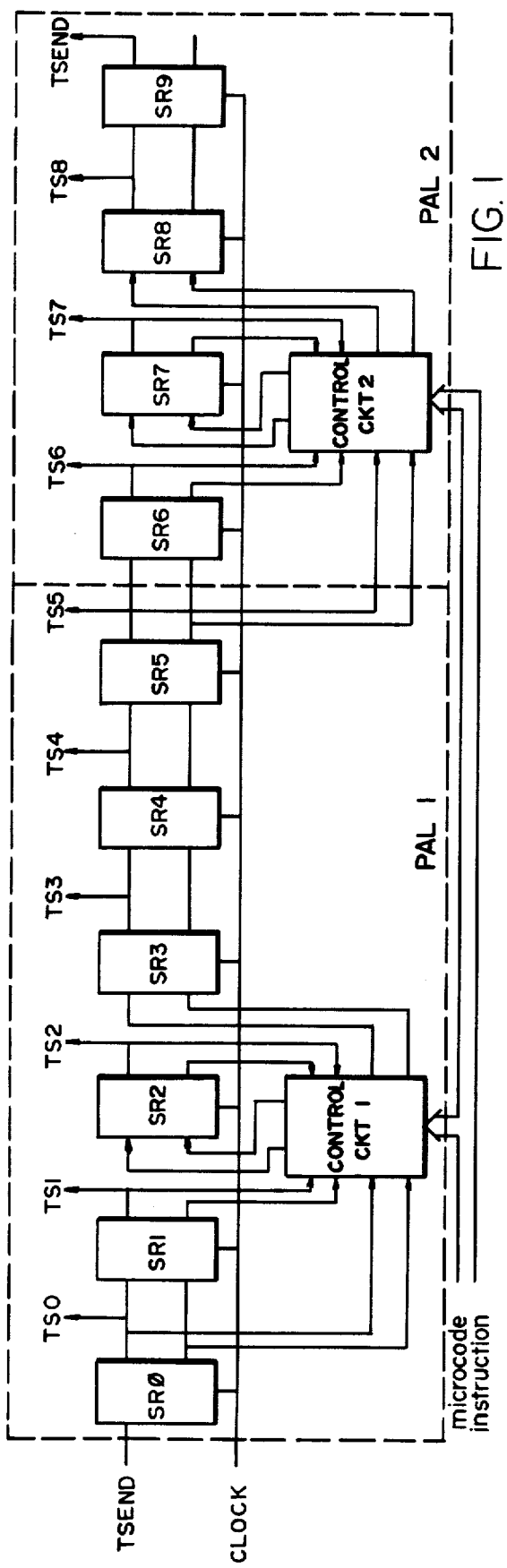
FIG. 1 is a schematic block diagram of the programmable logic arrays including the shift register and control circuits of the clock generator according to the present invention.

FIG. 1 shows two programmable array logic devices PAL1 and PAL2 which implement a 10 stage shift register including shift register elements SR0–SR9, each of which produces a different timing signal during shifting which are labeled TS0–TS8 and TSEND. Elements SR0 to SR5 and control circuit 1 are part of PAL1 and elements SR6 to SR9 and control circuit 2 are part of PAL2.

The various inputs and outputs of shift register elements SR0–SR3 are connected to first control circuit 1 and the inputs and outputs of shift register elements SR5–SR8 are connected to second control circuit 2. Both control circuits are fed by microcode instructions which enable the shift register to selectively skip register elements SR2 and SR7 and enable simultaneous outputs at SR1, SR3 and SR6, SR8. The results of this skipping can be seen in FIG. 3 at timing signals A and B. Timing signal A shows the situation when all of the shift register elements SR0–SR9 are being used and there is no skipping. In this situation where the clock signal is 30 nanoseconds long, timing signals TS0–TSEND are produced as shown.

Figure 3:
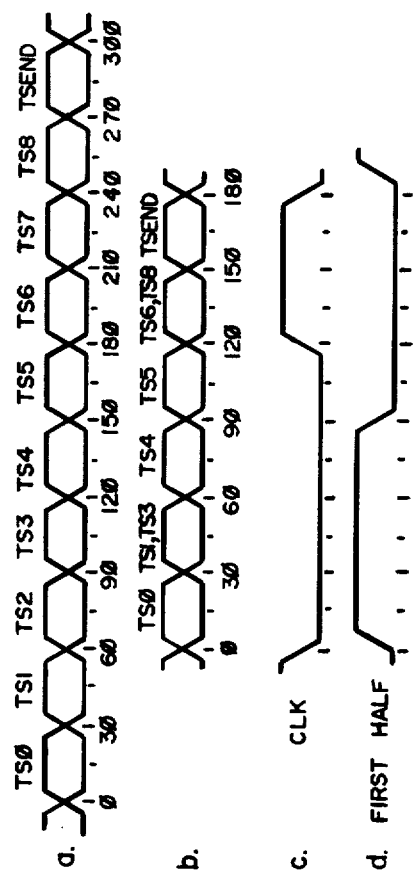
FIG. 3 shows relative timing of the circuitry of FIGS. 1 and 2.

In timing wave form B of FIG. 3, shift register elements SR2 and SR7 are skipped and the output of shift register element SR0 is simultaneously applied to shift register element SR1 and shift register element SR3 while the output of shift register element SR5 is simultaneously applied to shift register elements SR6 and SR8. As a result, the timing waveform of timing signals is shown which only last for 180 nanoseconds.

Figure 2:
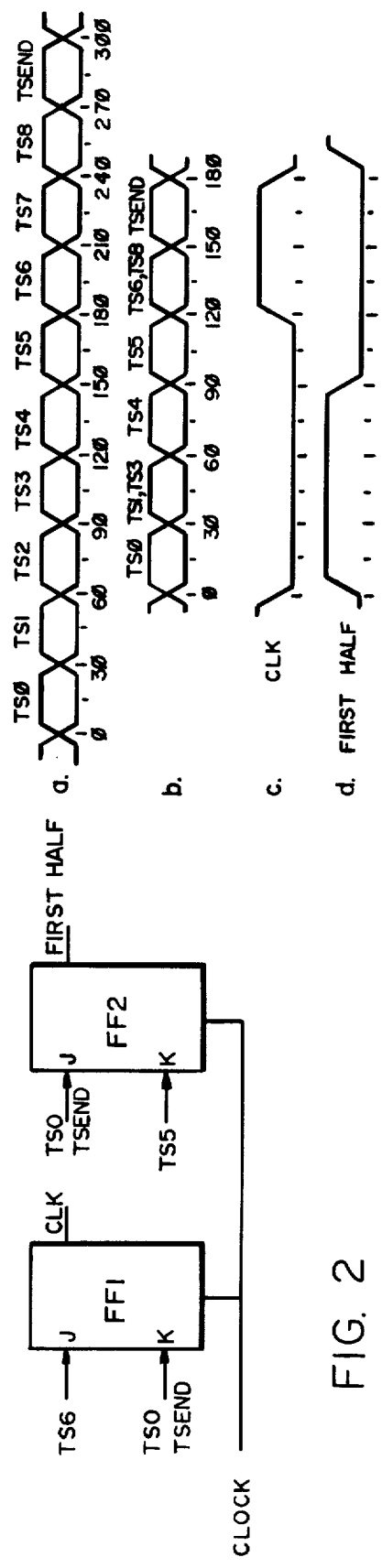
FIG. 2 shows the flip flops for generating the timing signals.

The timing signals TS0-TSEND are then utilized with JK flip flops FF1 and FF2 as shown in FIG. 2 in order to produce the timing signals CLK and first half shown in FIG. 3 at waveforms C and D.

As a result of the connection shown in FIG. 2, the signals can be generated based upon the timing of timing signals TS0, TS5, TS6 and TSEND. When a different microcode instruction is fed to PAL1 and PAL2 requiring that the skipping not occur, the signals CLK and first half will be changed in their relative lengths since the timing of these signals that does not depend on the skipped register elements, but those which are not skipped. Thus one can lengthen the logic 0 portion or logic 1 portion of the clock signal and the first half signal by altering the codes to the PAL1 and PAL2 devices.

It will be appreciated that the instant specification and claims are set forth by way of illustration and not limitation, and that various modifications and changes may be made without departing from the spirit and scope of the present invention.

What is claimed is:

1. A programmable clock generator comprising programmable logic array means including: a shift register having a plurality of register elements, each shift register element having an input for receiving a timing signal and an output for producing a timing signal during shifting and control means connected to selected ones of said inputs and outputs of the shift register elements and responsive to a code applied thereto for effecting the skipping of preselected shift register elements during shifting; and at least one JK flip-flop receptive of timing signals from the outputs of non-skipped shift register elements at the J and K inputs thereof to produce a clock signal at the output thereof having desired characteristics represented by said code.

* * * * *